(12) United States Patent
Canton et al.

(10) Patent No.: US 11,711,420 B2
(45) Date of Patent: Jul. 25, 2023

(54) AUTOMATED MANAGEMENT OF RESOURCE ATTRIBUTES ACROSS NETWORK-BASED SERVICES

(71) Applicant: Amazon Technologies, Inc., Reno, NV (US)

(72) Inventors: Jeffrey Cicero Canton, Seattle, WA (US); William Frederick Hingle Kruse, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 61 days.

(21) Appl. No.: 16/172,607

(22) Filed: Oct. 26, 2018

(65) Prior Publication Data
US 2019/0068690 A1    Feb. 28, 2019

Related U.S. Application Data

(63) Continuation of application No. 14/563,747, filed on Dec. 8, 2014, now Pat. No. 10,116,732.

(51) Int. Cl.
*H04L 67/10* (2022.01)
*H04L 41/0813* (2022.01)
(Continued)

(52) U.S. Cl.
CPC .......... *H04L 67/10* (2013.01); *H04L 41/0806* (2013.01); *H04L 41/0813* (2013.01);
(Continued)

(58) Field of Classification Search
CPC ............ H04L 41/0806; H04L 41/0813; H04L 41/0896; H04L 43/0876; H04L 67/10; H04L 67/1097
See application file for complete search history.

(56) References Cited

U.S. PATENT DOCUMENTS

| 5,208,914 A | 5/1993 | Wilson et al. |
| 6,510,434 B1 | 1/2003 | Anderson et al. |

(Continued)

FOREIGN PATENT DOCUMENTS

| CN | 2016/088037 | * | 6/2016 | ............ H04L 47/70 |
| WO | 2010074655 | | 7/2010 | |

OTHER PUBLICATIONS

U.S. Appl. No. 14/563,750, filed Dec. 8, 2014, Jeffrey Cicero Canton.

*Primary Examiner* — Chris Parry
*Assistant Examiner* — Dixon F Dabipi
(74) *Attorney, Agent, or Firm* — Robert C. Kowert; Kowert, Hood, Munyon, Rankin & Goetzel, P.C.

(57) ABSTRACT

A provider network hosting multiple network-based services that implement different resources for a client may provide automated management of resource attributes across the multiple network-based services. A client may send a request to a resource attribute service implemented at the provider network to add a resource attribute to different resources implemented among different network-based services that satisfy resource metadata selection criteria. In response to receiving the request, resource metadata maintained for the different resources implemented among the different network-based resources, which may include one or more previously applied resource attributes, may be evaluated to identify those resources that satisfy the resource metadata selection criteria. For those resources that satisfy the resource metadata selection criteria, the resource attribute may be added to the resource metadata maintained for the different resources.

20 Claims, 8 Drawing Sheets

(51) Int. Cl.
 *H04L 67/1097* (2022.01)
 *H04L 41/0896* (2022.01)
 *H04L 41/0806* (2022.01)
 *H04L 43/0876* (2022.01)

(52) U.S. Cl.
 CPC ...... *H04L 41/0896* (2013.01); *H04L 43/0876* (2013.01); *H04L 67/1097* (2013.01)

(56) References Cited

U.S. PATENT DOCUMENTS

| | | | |
|---|---|---|---|
| 6,718,390 B1 | 4/2004 | Still et al. | |
| 6,909,691 B1 | 6/2005 | Goyal et al. | |
| 7,548,985 B2 | 6/2009 | Guigui | |
| 7,617,289 B2 | 11/2009 | Srinivasan et al. | |
| 7,870,475 B2 | 1/2011 | Schachter | |
| 7,958,087 B2 * | 6/2011 | Blumenau | G06F 21/6218 707/610 |
| 8,856,540 B1 * | 10/2014 | Kirubanandan | G06F 21/30 713/182 |
| 9,021,118 B2 * | 4/2015 | John | G06F 16/4393 709/231 |
| 9,112,777 B1 * | 8/2015 | Barclay | H04L 41/0893 |
| 9,223,843 B1 | 12/2015 | Madhavarapu et al. | |
| 9,576,062 B1 * | 2/2017 | Siemssen | G06F 16/9566 |
| 9,600,521 B2 * | 3/2017 | Bastide | G06F 16/24578 |
| 2004/0088304 A1 * | 5/2004 | Wang | G06F 9/50 |
| 2007/0233715 A1 * | 10/2007 | Rekimoto | G06F 16/954 |
| 2008/0071922 A1 | 3/2008 | Chetuparambil et al. | |
| 2008/0244051 A1 * | 10/2008 | Morris | G06F 16/9535 709/223 |
| 2010/0114780 A1 * | 5/2010 | Tribe | G06Q 10/10 705/50 |
| 2010/0293270 A1 * | 11/2010 | Augenstein | G06F 11/324 709/224 |
| 2012/0158966 A1 * | 6/2012 | Eberlein | H04L 41/0813 709/226 |
| 2012/0210066 A1 | 8/2012 | Joshi et al. | |
| 2013/0054601 A1 * | 2/2013 | Whitlock | G06F 16/21 707/E17.046 |
| 2013/0247207 A1 * | 9/2013 | Hugard, IV | G06F 21/57 726/25 |
| 2014/0207861 A1 * | 7/2014 | Brandwine | H04L 51/32 709/204 |
| 2015/0350103 A1 * | 12/2015 | Bertram | H04L 47/70 709/226 |
| 2015/0379429 A1 | 12/2015 | Lee et al. | |
| 2017/0048160 A1 * | 2/2017 | Wu | H04L 67/16 |
| 2019/0140972 A1 * | 5/2019 | Xu | G06F 16/245 |
| 2019/0155941 A1 * | 5/2019 | Bhide | G06N 20/00 |
| 2020/0007455 A1 * | 1/2020 | Chhabra | H04L 41/0893 |

* cited by examiner

*resource tag interface 500*

New Tagging Request *510*

○ — 522 ADD    ○ — 524 MODIFY    ○ — 526 REMOVE

[ selection criteria *512* ]    [ tag(s) *514* ]

( SUBMIT ) — 516

Tagging Request History *530*

| | Request ID | Active |
|---|---|---|
| (MODIFY) — 532a | 1345677 | No |
| (MODIFY) — 532b | 1345678 | Yes |
| (MODIFY) — 532c | 1345679 | No |
| ⋮ | | |

*FIG. 5A*

*resource tag interface 500*

Tagging Request Results *550*

● — 552 ▼ Detailed View

| Resource ID | Location | Type |
|---|---|---|
| BNY17655-315 | North | storage |
| BDC17655-319 | South | compute |
| BWA17783-512 | North | compute |
| BCN17232-516 | West | compute |
| BWR17783-533 | North | database |
| BTP17232-226 | West | data stream |
| ⋮ | | |

*FIG. 5B*

AUTOMATED MANAGEMENT OF RESOURCE ATTRIBUTES ACROSS NETWORK-BASED SERVICES

This application is a continuation of U.S. patent application Ser. No. 14/563,747, filed Dec. 8, 2014, now U.S. Pat. No. 10,116,732, which is hereby incorporated by reference herein in its entirety.

BACKGROUND

Cloud-based infrastructure offers many advantages for companies, developers, or other entities that may implement new systems and technologies leveraging the accessibility, flexibility, and reliability. Many different types of services, systems, or functions may be implemented using cloud-based resources for client systems or devices. For example, cloud-based resources, such as virtual compute instances, may be used to implement a network-based service for external customers, such as an e-commerce platform. Cloud-based resources may also be used to implement a service or tool for internal customers, such as information technology (IT) service implemented as part of an internal network for a corporation. Cloud-based resources, such as virtual networks, may be used to direct or control network traffic in order to perform the various functions or tasks provided by the services or functions performed utilizing other cloud-based resources, in another example. Instead of investing resources in acquiring various hardware and software components, cloud-based resources may be procured to provide the infrastructure upon which these new systems and technologies may be built.

Cloud-based resources are often provided by a provider network, which may include many different types of network-based services that can be used to implement cloud-based infrastructure resources. Developers can request, provision, and configure various different cloud-based resources from the network-based services offered as part of the development of new systems and products. However, as infrastructure requirements become more complex, the development costs to procure, configure, and test cloud-based resources may increase, as the time and expertise needed to configure and test different respective network-based services in the provider network may increase. Moreover, as the demand to rapidly develop new systems and products in the cloud grows, the speed at which development may occur becomes even more important to compete effectively. Thus, various organizational techniques to label and/or categorize resources implemented in a provider network have become increasingly important.

BRIEF DESCRIPTION OF THE DRAWINGS

FIGS. 5A and 5B are example illustrations of graphical user interfaces for submitting tagging requests to a resource tagging service for a provider network, according to some embodiments.

Figure 1:
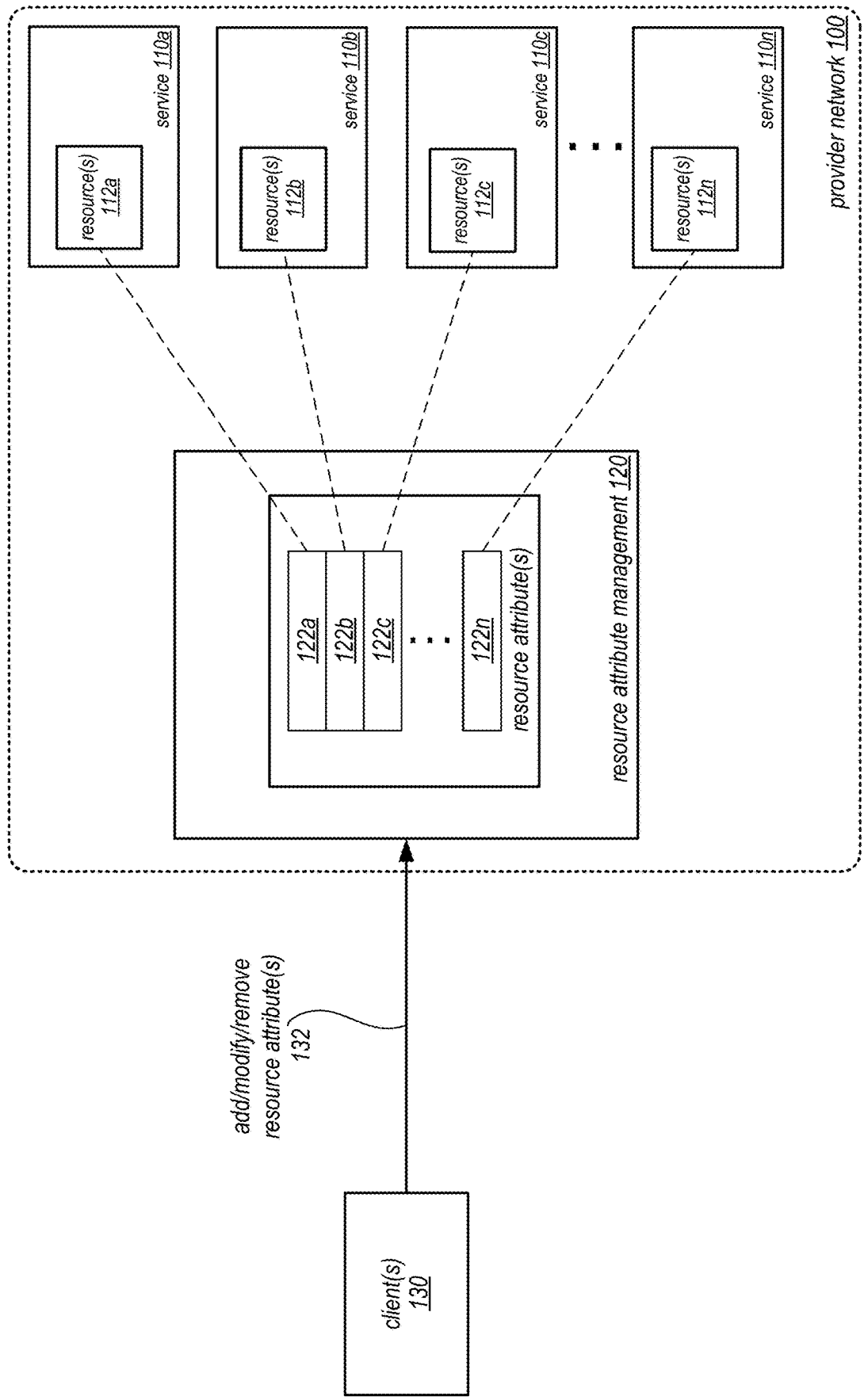
FIG. 1 is a logical data flow diagram illustrating automated management of resource attributes across network-based resources, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement automated management of resource attributes across network-based services, according to some embodiments. A provider network may supply clients, operators, or other customers with access to and/or control of resources implemented by different network-based services that are implemented as part of the provider network. These resources may include various types of computing systems or devices configured for communication over a network that provide several different kinds of services, from computing or processing services, storage services, to database services or content delivery services. For example, in some embodiments, a provider network may include a virtual computing service that provides virtual computing resources to clients, users, or other type of customers, in the form of compute instances (e.g., a virtual machine acting as a distinct logical computing system that provides users with the illusion that they are the sole operators and administrators of a given hardware computing resource).

Clients of the provider network may reserve (i.e., purchase or buy) one or more resources (such as compute instances) to perform various functions, services, techniques, and/or applications. Various different configurations of the resources may be determined, arranged, or developed in order to implement these desired functions, services, techniques, and/or applications. For instance, one or more virtual compute instances may be configured using a particular machine image (e.g., a software stack) that has been developed to implement a particular application and placed within a particular virtual network resource configured to include the virtual compute instances. Once these virtual compute instances are configured and launched, it may then be desirable to tag, track, or organize these instances, and other provider network resources that have been acquired for a client of the provider network.

In various embodiments, resource attributes may be implemented to describe, identify, and interact with the resources of a provider network. For example, a client may automate various management actions for a system composed of resources implemented in a provider network, from deploying new resources, to separating out production and development resources. However, as noted above, a provider network may offer many different types of network-based services that may have specific means for interacting with a client. Various different programmatic interfaces (APIs), for instance, may be used to communicate with, setup, and configure resources for each of the network-based services. Thus, complex infrastructures or configurations of resources implemented via the use of multiple network-based services in the provider network may require many separate interactions to manage resource attributes, if resource adding/modifying/removing resource attributes is limited to those resources provided by a particular network-based service. Moreover, as the number of resources may dynamically change (e.g., due to various scaling and other virtual computing mechanisms), manual attribution of resources may grow cumbersome and costly.

FIG. 1 is a logical data flow diagram illustrating automated management of resource tagging across network-based resources, according to some embodiments. Provider network 100 may implement various different network-based services 110, such as services 110a, 110b, 110c through 110n. Client(s) 130 may procure respective resources, 112a, 112b, 112c through 112n at these various services 110 in order to perform various tasks. Provider network 100 may implement a resource attribute management module to provide a centralized resource attribute manager for client(s) 130.

A resource attribute may, in various embodiments, be a tag, label, set of metadata, or any other descriptor or information corresponding to a provider network resource, implemented at one of various network-based services of the provider network. Attributes may be represented in various ways, such as a key-value pair, multiple values, or any other arrangement of information descriptive of the resource. Resource attributes for a resource may be maintained as part of resource metadata for the resources at network-based services. Network-based services 110 may create resource metadata and/or attributes when a resource is created by a client. However, a client may wish to modify, remove, and/or add new resources attributes to the resource metadata in order to provide greater flexibility for automating various interactions within the resources utilizing resource metadata.

As illustrated in FIG. 1, client(s) 130 may submit a request to add/modify/remove resource attribute(s) 132 for resources implemented in services 110b. Instead of identifying specific resources individually, the request 132 may include selection criteria that may be evaluated with respect to the resource metadata maintained for the different resources. In this way, if new resources have been added (e.g., as a result of an auto scaling operation), then the new resources which may be unknown may be attributed in a desirable way along with those known resources. Thus, as illustrated in FIG. 1, resource tag attribute module 120 maintains resource attribute 122a through 122n that correspond to the various resources 112 in services 110.

Figure 6:
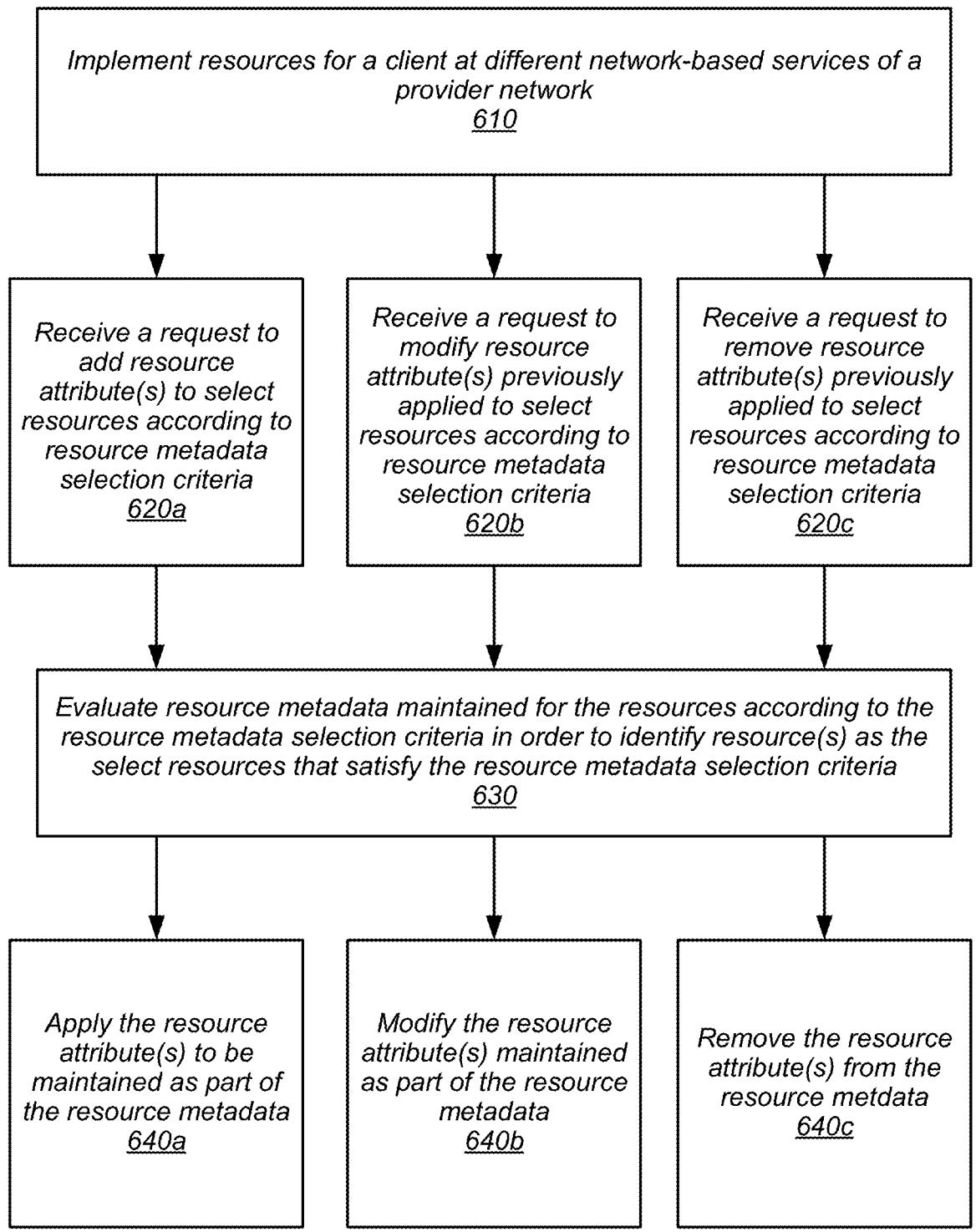
FIG. 6 is high-level flowchart illustrating various methods and techniques for implementing automated management of resource attributes across network-based services, according to some embodiments.
Figure 7:
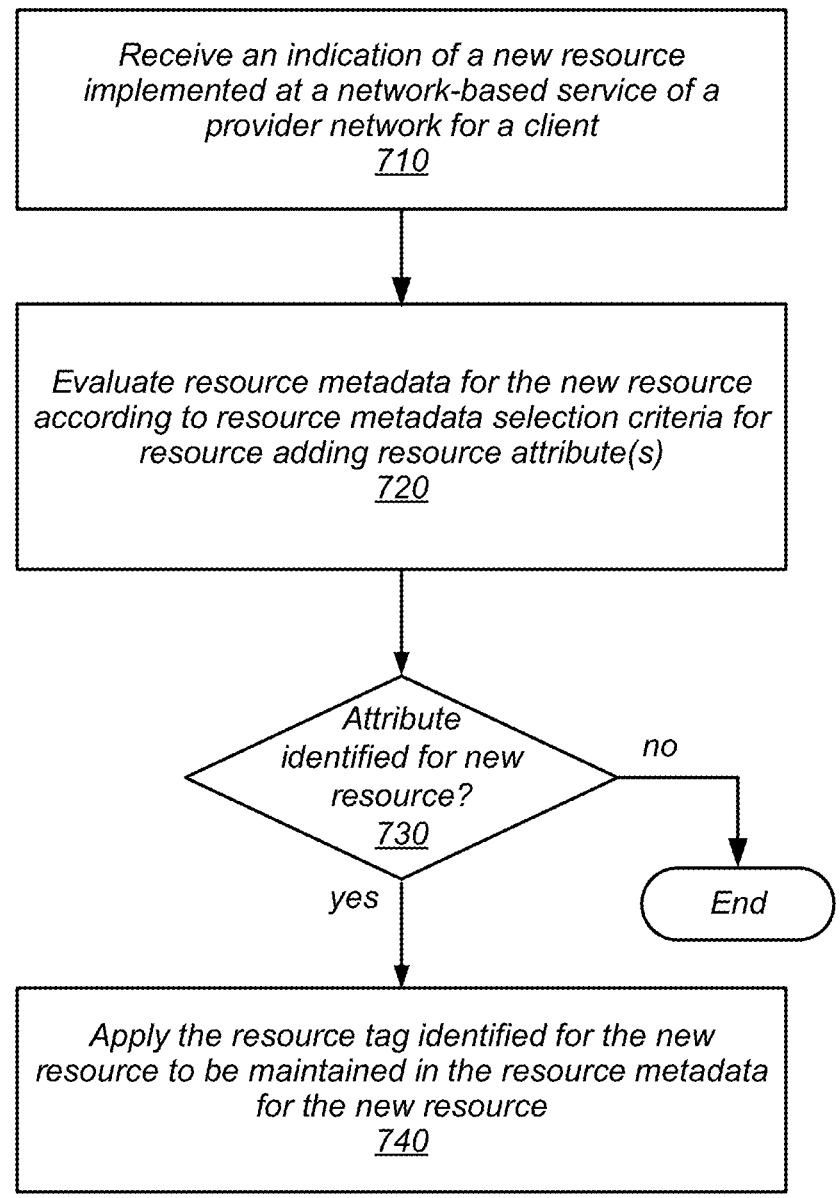
FIG. 7 is a high-level flowchart illustrating various methods and techniques for implementing applying resources attributes to new resources according to selection criteria, according to some embodiments.

When a resource request is received, the resource metadata for the resources 112 may be evaluated according the specified selection criteria, as discussed below with regard to FIGS. 6 and 7. For those resources that are identified as satisfying the criteria, the resource tag attribute module 120 may perform the requested addition, modification, or removal. Resource attribute requests may be maintained so that when new resources are added that satisfy the criteria, the same resource attribution request may be performed automatically, as discussed below with regard to FIG. 7.

Please note that previous descriptions are not intended to be limiting, but are merely provided as a logical example of a provider network, network-based services, clients, and resource attribute management. Various other components may interact with or assist in implementing a service platform specific language.

This specification next includes a general description of a provider network, which may implement a resource tag service to provide automated management of resource attributes for resources in the provider network. Various examples of a provider network, resource tag service, network-based services and clients are discussed, including different components/modules, or arrangements of components/module that may be employed as part of a resource tag service. A number of different methods and techniques to implement automated management of resource attributes across network-based services are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
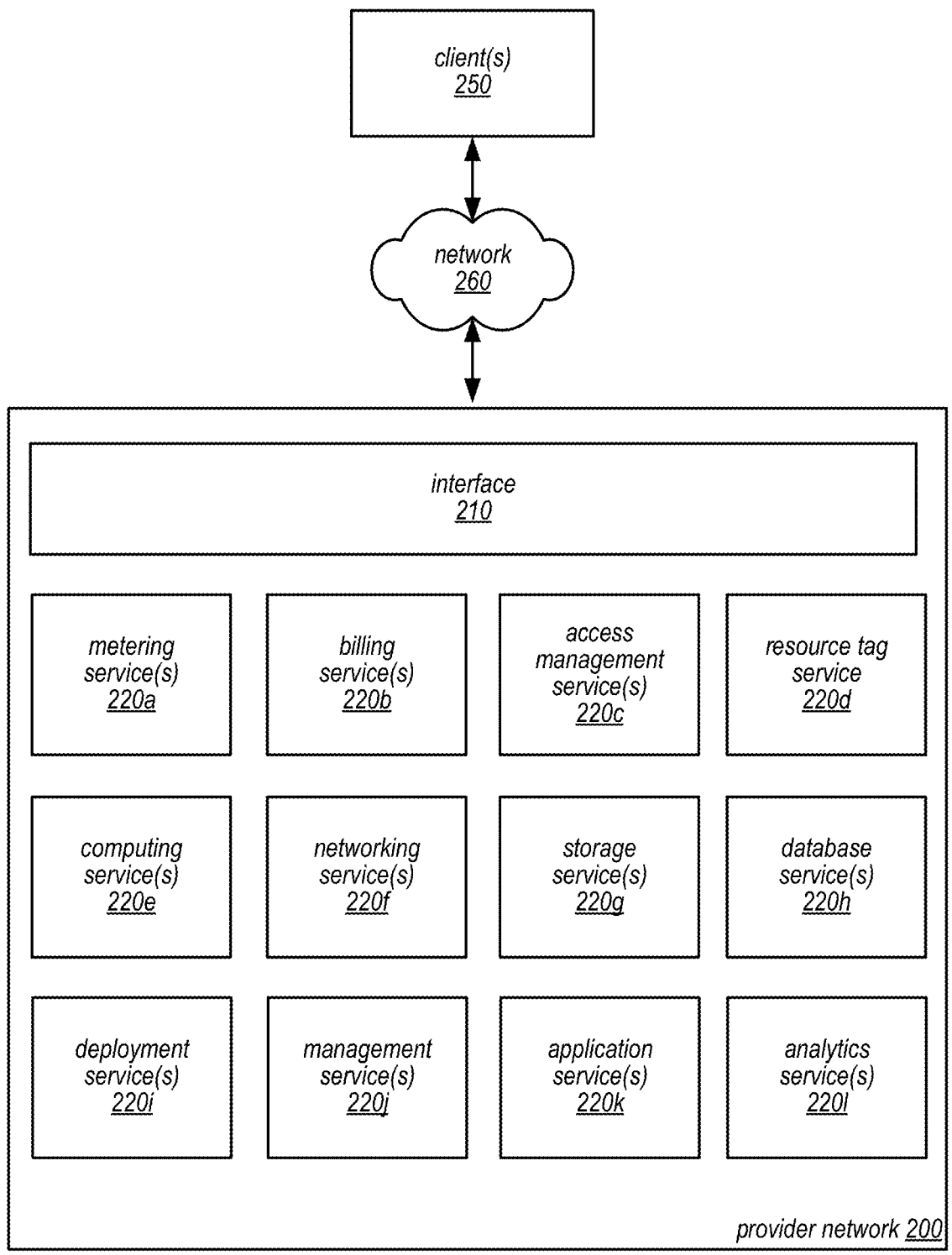
FIG. 2 is block diagram illustrating a provider network that implements multiple different network-based services for clients, including a resource tag service, according to some embodiments.

FIG. 2 is block diagram illustrating a provider network that implements multiple different network-based services for clients, including a resource tag service, according to some embodiments. Provider network 200 may be set up by an entity such as a company or a public sector organization to provide one or more network-based services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like, needed to implement and distribute the infrastructure and services offered by the provider network 200. In at least some embodiments, provider network 200 may be organized into different regions, data centers, or other collections of devices to implement the services offered by provider network 200. Clients 250 may be configured to access via network 260 network-based services implemented as part of provider network 200 to perform various tasks, implement various systems, functions, or applications.

Provider network 200 may implement many different kinds of services, and thus the following discussion of various services is not intended to be limiting. For example, various network-based services may be implemented such as deployment service(s) 220i, management service(s) 220j, application service(s) 220k, and analytic service(s) 220l. In some embodiments, provider network 200 may implement storage service(s) 220g. Storage service(s) 220g may be one or more different types of services that provide different types of storage. For example, storage service(s) 220g may be an object or key-value data store that provides highly durable storage for large amounts of data organized as data objects. In some embodiments, storage service(s) 220g may include an archive long-term storage solution that is highly-durable, yet not easily accessible, in order to provide low-cost storage. In some embodiments, storage service(s) 220g may provide virtual block storage for other computing devices, such as compute instances implemented as part of virtual computing service 240. For example, a virtual block-based storage service 220g may provide block level storage for storing one or more data volumes mapped to particular clients, providing virtual block-based storage (e.g., hard disk storage or other persistent storage) as a contiguous set of logical blocks. Storage service(s) 220g may replicate stored data across multiple different locations, fault tolerant or availability zones, or nodes in order to provide redundancy for durability and availability for access.

In some embodiments, provider network 200 may implement database service(s) 220h. Database services 220h may include many different types of databases and/or database schemes. Relational and non-relational databases may be implemented to store data, as well as row-oriented or column-oriented databases. For example, a database service that stores data according to a data model in which each table maintained on behalf of a client contains one or more items, and each item includes a collection of attributes, such as a key value data store. In such a database, the attributes of an item may be a collection of name-value pairs, in any order, and each attribute in an item may have a name, a type, and a value. Some attributes may be single valued, such that the attribute name is mapped to a single value, while others may be multi-value, such that the attribute name is mapped to two or more values.

Provider network 200 may implement networking service(s) 220f in some embodiments. Networking service(s) 220f may configure or provide virtual networks, such as virtual private networks (VPNs), among resources implemented in provider network 200 as well as control access with external systems or devices. For example, networking service(s) 220f may be configured to implement security groups for compute instances in a virtual network. Security groups may enforce one or more network traffic policies for network traffic at members of the security group. Membership in a security group may not be related to physical location or implementation of a compute instance. The number of members or associations with a particular security group may vary and may be configured.

Networking service(s) 220f may manage or configure the internal network for provider network 200 (and thus may be configured for implementing various resources for a client 250). For example, an internal network may utilize IP tunneling technology to provide a mapping and encapsulating system for creating an overlay network on network and may provide a separate namespace for the overlay layer and the internal network layer. Thus, in this example, the IP tunneling technology provides a virtual network topology; the interfaces that are presented to clients 250 may be attached to the overlay network so that when a client 250 provides an IP address that they want to send packets to, the IP address is run in virtual space by communicating with a mapping service (or other component or service not illustrated) that knows where the IP overlay addresses are.

In some embodiments, provider network 200 may implement virtual computing service 220e, to provide computing resources. These computing resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. In some embodiments clients 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 250 applications, without for example requiring the client 250 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc . . . and (in the case of reserved compute instances) reservation term length.

In various embodiments, provider network 200 may implement components to coordinate the metering and accounting of client usage of network-based services, including network-based services 220e-220l, such as by tracking the identities of requesting clients, the number and/or frequency of client requests, the size of data stored or retrieved on behalf of clients, overall storage bandwidth used by clients, class of storage requested by clients, or any other measurable client usage parameter. Provider network 200 may also implement financial accounting and billing service(s) 220b, or may maintain a database of usage data that may be queried and processed by external systems for reporting and billing of client usage activity. In certain embodiments, provider network 200 may implement components (e.g., metering service(s) 220a) that may be configured to collect, monitor and/or aggregate a variety of service operational metrics, such as metrics reflecting the rates and types of requests received from clients, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients to enable such clients to monitor their usage of network-based services.

In some embodiments, provider network 200 may implement components to implement user authentication and access control procedures, such as access management service(s) 220c, for provider network 200 resources. For example, for a given network-based services request to access a particular compute instance, provider network 200 may implement components configured to ascertain whether the client associated with the access is authorized to configured or perform the requested task. Authorization may be determined such by, for example, evaluating an identity, password or other credential against credentials associated with the resources, or evaluating the requested access to the provider network 200 resource against an access control list for the particular resource. For example, if a client does not have sufficient credentials to access the resource, the request may be rejected, for example by returning a response to the requesting client indicating an error condition. In at least some embodiments resource tag service 220d, discussed in more detail below with regard to FIGS. 3-5, may provide access to and management of resource attributes, such as tags, maintained for resources implemented at different network-based services.

Network-based services implemented as part of provider network 200 may each implement respective programmatic interfaces, in some embodiments. For example, requests directed to virtual computing service 220e may be formatted according to an API for virtual computing service 220e, while requests to storage service(s) 220g may be formatted according to an API for storage service(s) 220g. Different portions of the various APIs may be exposed to external clients, in some embodiments, with some other portions remaining available to internal clients, such as other network-based services in provider network 200. A provider network for network-based services platform 200 may also be implemented, in some embodiments, as interface 210. Interface 210 may be a programmatic interface and/or a graphical user interface (e.g., hosted on a network-based site for the provider network). Interface 210 may allow various requests, such as those discussed below with regard to FIGS. 4-5B.

Clients 250 may encompass any type of client configurable to submit requests to network-based services platform 200, in various embodiments. For example, a given client 250 may include a suitable version of a web browser, or may include a plug-in module or other type of code module configured to execute as an extension to or within an execution environment provided by a web browser. In some embodiments, clients 250 may include sufficient support to send the requests according to various programmatic interfaces for the service, as well as other supported protocols at the resources (e.g., Hypertext Transfer Protocol (HTTP)) for generating and processing network-based service requests without necessarily implementing full browser support. In some embodiments, clients 250 may be configured to generate network-based services requests according to a Representational State Transfer (REST)-style network-based services architecture, a document- or message-based network-based services architecture, or another suitable network-based services architecture. In some embodiments, a client 250 (e.g., a computational client) may be configured to provide access to network-based resource in a manner that is transparent to applications implemented on the client 250 utilizing the provider network resource.

Clients 250 may convey network-based services requests to provider network 200 via network 260. In various embodiments, network 260 may encompass any suitable combination of networking hardware and protocols necessary to establish network-based communications between clients 250 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network. It is noted that in some embodiments, clients 250 may communicate with network-based service using a private network rather than the public Internet.

Figure 3:
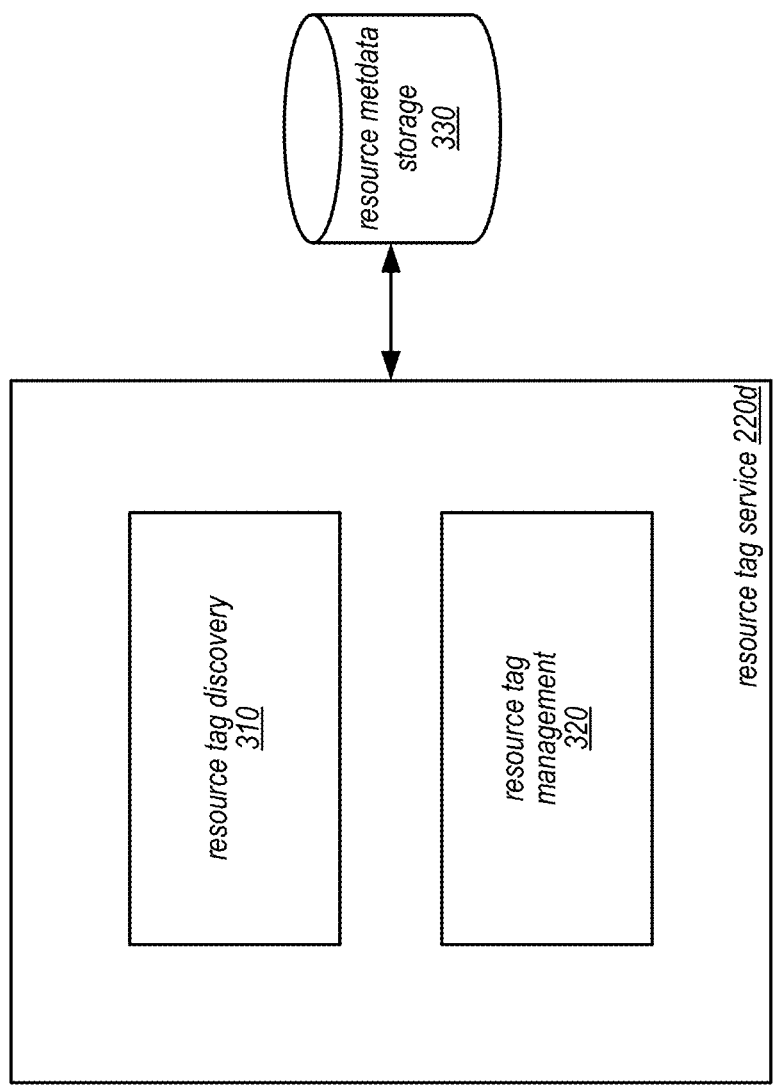
FIG. 3 is a block diagram illustrating a resource tag service that may provide automated management of resource attributes across network-based resources, according to some embodiments.

FIG. 3 is a block diagram illustrating a resource tag service that may provide automated management of resource attributes, such as tags, across network-based resources, according to some embodiments. Resource tag service 220d, as noted above, may provide access to and management of resource metadata maintained for resources implemented at different network-based services. As noted above, a provider network may be implemented or distributed across multiple data centers, regions or other collections of systems or devices (which may be referred to herein as infrastructure regions). In some embodiments, resource tag service 220d may be implemented, distributed and/or replicated across these different infrastructure regions. For example, resource tag discovery service 310 in FIG. 3 may be implemented for each infrastructure region of a provider network, providing an authoritative system for handling resource attribute operations for resources implemented within that region or data center. Some resource attribute operations may span multiple regions or data centers, and the different portions of resource tag service 220d replicated across the different regions or data centers may communicate information to one another as a part of performing different resource attribute operations. As illustrated in FIG. 3, resource tag service may implement a resource tag discovery module 310, for searching, evaluating, locating, and/or otherwise returning resource tags/or other resource attributes. Resource tag service 220d may also implement resource tag management component 320 to process requests to create, modify, and/or remove tags. Resource metadata storage 330 may be accessible to resource tag service 220*d*, either as dedicated storage for resource tag service 220*d* to persistently maintained resource attributes, such as tags, and/or may be implemented as part of another service, such as database services 220*h* and/or storage services 220*g*.

In various embodiments, resource tag discovery module 310 may be configured to identify those resources that satisfy selection criteria for attribution requests, as well as respond to requests for resource attributes, such as tags, specific to a particular resource, as discussed below with regard to FIGS. 6 and 7. For example, in some embodiments resource tag discovery module 310 may act as a query engine that processes queries for particular resources/resource attributes/tags. For example, in a least some embodiments, a portion of resource metadata storage may be allocated to and/or structured for resource tag discovery module 310, such as structured for online analytical processing (OLAP). In this way, resource tag discovery module can efficiently evaluate attribution request selection criteria, as well as provide quick responses to requests for specific metadata, in various embodiments.

In some embodiments, resource tag management module 320 may be configured to apply/modify/remove resource attributes, such as tags, as discussed below with regard to FIGS. 6 and 7. For example, in various embodiments, resource tag management module 320 may act as a transaction engine that is configured to update resource tags and other resource attributes according to the identified resources provided by resource tag discovery module 310 for a tagging or other attribution request. In at least some embodiments, a portion of resource metadata storage 330 may be allocated to and/or structured for resource tag management module 320, such as structured for online transaction processing (OLTP). In this way, resource tag management module 320 may provide consistency to updates made to resource tags (e.g., in the event of current updates to a particular resource, resource tag, other resource attributes, etc . . . ).

Resource metadata storage 330 may provide persistent storage for resource metadata in various embodiments. In some embodiments, resource metadata storage may be configured differently for resource tag discovery and resource tag management 320, as noted above. For example, two data stores, storage engines, replicas, and/or storage services may be configured to provide the different types of storage. In at least some embodiments, storage for resource tag management 320 may push updates to the replica for resource tag discovery 310.

Figure 4:
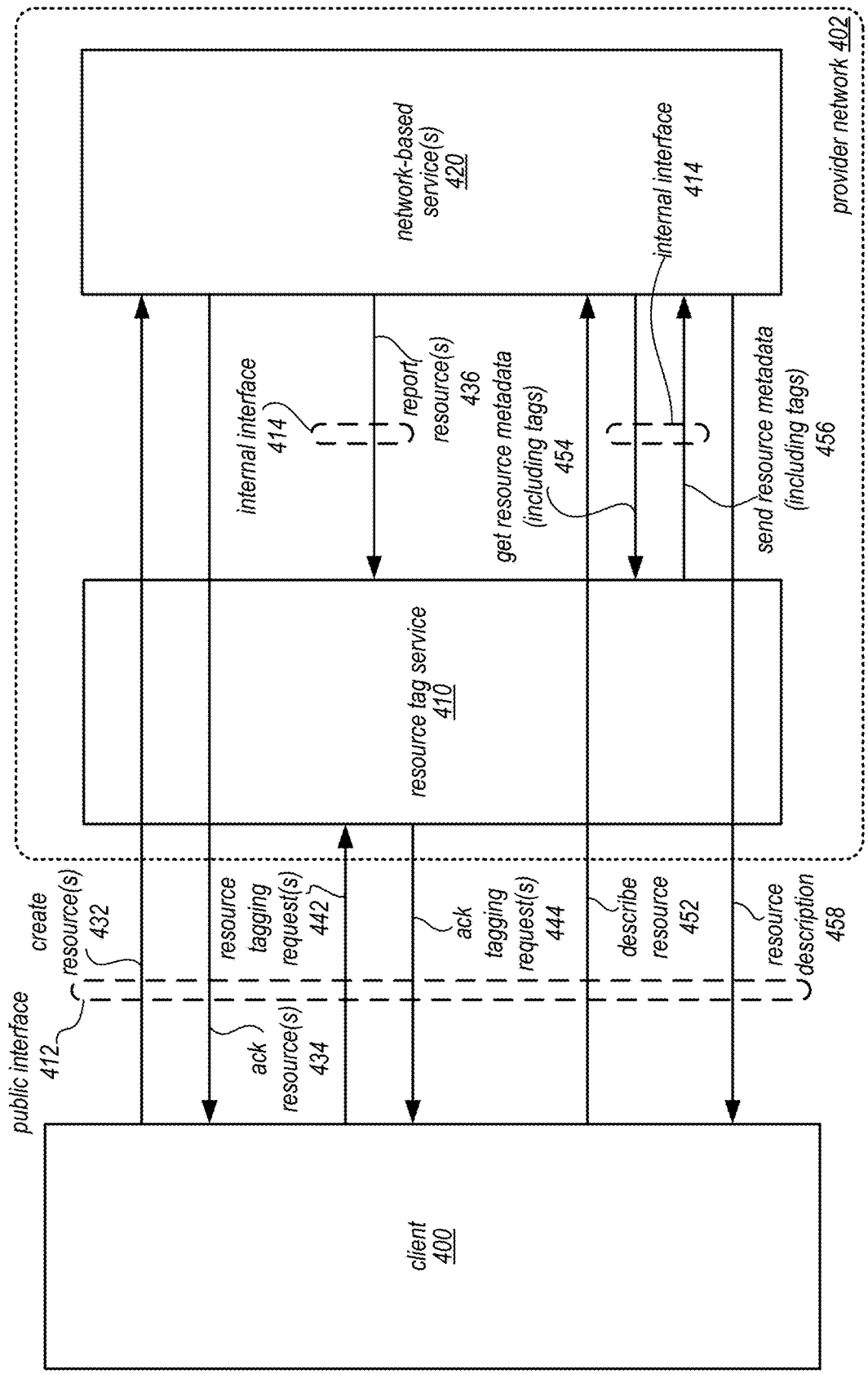
FIG. 4 is a diagram illustrating interactions among a client, resource tagging service, and network-based services, according to some embodiments.

FIG. 4 is a diagram illustrating interactions among a client, resource tagging service, and network-based services, according to some embodiments. A client 400 may interact with provider network 402, and resources and services therein via a public interface 412. Public interface 412 may be a programmatic interface, such as an application programming interface (API), and/or a graphical user interface (GUI). Requests and other communications from client 400 may be formatted according to public interface 412.

Client 400 may send a request to create one or more resources 432 to network-based service(s) 420, in various embodiments. For example, clients may provision various compute instances, databases, storage volumes, data streams, or any other type of resource offered by provider network 402, such as discussed above with regard to FIG. 2. The various network-based resources 420 responsible for implementing the resource may acknowledge the resources 434 back to the client 400 upon creation. In various embodiments, the network-based resources may also report 436 the new resources to resource tag service 410 via internal interface 414 (which may be implemented to facilitate communication between network-based service(s) 420 and resource tag service 410 internally). Internal interface 414 may, in various embodiments, be a programmatic interface. Resource metadata, such as the type, location, account, owner/creator, and/or any other network-based service 420 generated resource attribute (which may also be/include resource tags) may be provided as part of reporting the resources 436. As discussed above with regard to FIG. 3, resource tag service 410 may maintain the resource metadata for the network-based services.

Client 400 may also submit various resource tagging requests 442 (or other resource attribution requests), such as those discussed above with regard to FIG. 1 and FIGS. 5A-7 below. For example, the client may submit a request to add a resource tag to resources of a customer account associated with client 400. In at least some embodiments, the resource requests may specify selection criteria to identify those resources to be tagged according to the request. Resource tag service 410 may acknowledge the tagging requests 444 to the client (or report errors).

Network-based services 420 may provide API commands or other requests to return description information for resources implemented at the network-based services 420. As illustrated in FIG. 4, client 400 may send a describe resource request 452 to network-based service(s) 420 to obtain specific resource metadata for a particular resource. Resource tag service 410 may be authoritative for resource attributes. For example, in some embodiments, network-based services 420 may obtain 454 the resource metadata (including tags added/modified in the metadata) from resource tag service 410 via internal interface 414. Resource tag service 410 may provide the resource metadata for the particular resource 456 including resource tags to network-based service 420, which may then provide the resource description 458 to client 400.

As noted above, a provider network may offer different types of interfaces in order to implement automated management of resource attributes, such as resource tags, across network-based services. FIGS. 5A and 5B are example illustrations of graphical user interfaces for submitting tagging requests to a resource tag service for a provider network, according to some embodiments.

As illustrated in FIG. 5A, a resource tag interface 500 may implement many different graphical user interface elements to facilitate the various types of resource tagging requests discussed above with regard to FIGS. 1 and 4, as well as FIGS. 6 and 7 below. New tagging request area 510 may implement various user interface elements to process a tagging resource request. For example, different selection components 522, 524 and 526 may respectively allow a user to select a particular type of tagging resource request, whether to add a resource tag 522, modify a resource tag 524, or remove a resource tag 526. In FIG. 5A, the add request 522 is illustrated as selected. Various user input elements, such as text string elements 512 and 514 may be provided in order to submit the add request for a resource tag. For example, selection criteria input element 512 may allow a user to enter various values, Boolean expressions, or other identifiers that provide selection criteria to be evaluated for a resource tag request. Similarly, tag input element 514 may allow a user to input one or more resource tag values to be added for those select resources that satisfy the selection criteria, such as various key value pairs. The SUBMIT user interface element 516 may trigger the generation of the request to add the resource tag specified in element 514 according to the selection criteria 512. In at least some embodiments, selecting SUBMIT 516 may trigger the generation of a message that is formatted according to a programmatic interface for the provider network/resource tagging service. Please note that various other types of user interface elements (e.g., drop-down menus, new windows, or guided input instructions) may be displayed, and thus previous illustration is not intended to be limiting.

In some embodiments, resource tag interface 500 may implement a tagging request history area 530, which may display the various previous tagging requests submitted for a particular customer account. For example, as illustrated in FIG. 5A the request ID and whether or not the tag is still actively applied (as discussed below with regard to FIG. 7) may be displayed. In at least some embodiments, user interface elements 532 may be provided to modify a particular tagging request, to change, for instance the selection criteria. A resource tag that is currently applied to new resources that satisfy the selection criteria and are added to the provider network for the customer account may be identified as active, like request ID 1345678. If a user wished to disable the application of the resource tag, then modify element 532b may be selected, which may trigger a new selection criteria modification form similar to new tagging request area 510.

As illustrated in FIG. 5B, tagging results for a tagging request may be displayed. Resource tag interface 500 may implement tagging request results area 550 which may be displayed in response to an acknowledgment/completion of a tagging request. In some embodiments, the number of affected resources may be displayed. As illustrated in FIG. 5B, a user interface element 552 may be selected to provide a detailed view of those resources affected by a request, such as the resource ID, location, and type of resource. In some embodiments, if a tagging request fails or an error occurs, an error message (and possibly corrective actions) may be displayed in tagging request results area 550 (not illustrated).

The clients, provider network, network-based services, resource tag services, and other components that implement automated management of resource attributes across network-based services discussed above with regard to FIGS. 1-5 have been given as examples. Various other types or configurations of clients, provider network, network-based services, resource tag or attribute services, and other components may implement these techniques. Thus, FIG. 6 is a high-level flowchart illustrating various methods and techniques for implementing automated management of resource attributes across network-based services, according to some embodiments.

As indicated at 610, resources for a client may be implemented at different network-based resources of a provider network. As discussed above with regard to FIG. 2, a provider network may offer multiple different types of services, which may correspondingly provide different types of resources for use by a client of the provider network. Resource attributes, such as various resource tags, labels, sets of metadata, or other descriptive information may be maintained describing the various resources implemented for a client. For example, resource attributes may describe a particular resource identifier (e.g., which may be unique for the provider network), resource type, and/or location of the resource. In at least some embodiments, a provider network may include multiple different regions or locations, each of which may maintain resource metadata for the resources implemented as part of the services within the respective region.

Different types of resource requests to add/modify/remove resource attributes may be received from clients in various embodiments. For example, as indicated at 620a, a request to add resource attribute(s) to select resources according to resource metadata selection criteria may be received. The request may specify the resource attribute value, for instance, as a key-value pair, or some other designator or metadata to describe or denote resources. Similarly, as indicated at 620b, a request to modify resource attribute (s) previously applied to select resources may be received according to resource metadata selection criteria. For instance, a replacement and/or additional resource attribute value may be specified. Additionally, as indicated at 620c, a request to remove resource attribute (s) previously applied to resource metadata selection criteria may be received. For example, a specific resource attribute to remove from the resources may be specified, leaving other resource attributes undisturbed.

In order perform resource attribution requests, the affected resources in the provider network may need to be identified. As indicated at 630, resource metadata maintained for the resources in the provider network may be evaluated according to the resource metadata selection criteria provided in the attribution request, in order to identify resource(s) as the select resources that satisfy the resource metadata selection criteria, in various embodiments. For example, in various embodiments, resource data may be maintained in a searchable format, such as a database table or other structured data store. In at least some embodiments, the structured data store may be a key value store, such as a non-relational database. As discussed above with regard to FIG. 3, storage maintaining resource tags and other resource attributes for resources in a provider network may replicated and/or stored in various ways to facilitate different operations. For example, a copy of the resource metadata may be maintained in a data store configured for online analytical processing (OLAP) in order to easily search for particular resources that satisfy the resource metadata selection criteria.

The resource metadata selection criteria may include various predicates, Boolean expressions, values, conditions, or other representations of ways to identify specific resources based on an evaluation of the resource metadata. For instance, the selection criteria may specify various types of resources (e.g., compute instance, database, storage volume, data stream, etc.), location of the resource (e.g., a particular region of the provider network or fault tolerant zone), creator/owner (e.g., particular user name or identifier). As provider network may host resources for multiple different clients, in some embodiments, a default account identifier or criteria may be added to selection criteria received from a client, in order evaluate and/or modify only those resources "owned" by a request client (or an account associated with the client). In at least some embodiments, multiple resources implemented at different network-based services may be included in the same attribution request 620 without performing individual requests for each network-based service.

Once the resources identified, the requested attribute operations may be performed. For instances, as indicated at 640a, the resource attribute(s) requested at element 620a may be applied to the identified resources to be maintained as part of the resource metadata describing the identified resources. For example, a tag data store or other form storage maintaining resource metadata may be written/to or updated to reflect the new resource tag. As noted earlier, the resource attribute data may be stored in a structured data store configured to perform online transaction processing (OLTP) in order to provide consistent updates to resource metadata for resources. As indicated at 640*b*, for requests to modify resource attribute (s) 620*b*, the resource attributes may be modified and maintained as part of the resource metadata for the identified resources. As for those resource attribute (s) removed 620*c*, the resource tag(s) may be removed from the resource metadata for the identified resources, as indicated at 640*c*, in various embodiments.

The resource metadata maintained and changed according to various attribution requests may, in some embodiments, be provided in response to request for a resource metadata specific to one or more particular resources. For example, as illustrated above in FIG. 4, different network-based services may offer "DESCRIBE" API calls, which provide a requesting client of the service descriptive information about a resource. In some embodiments, the network-based services may issue such describe calls to a tag resource service or other component maintaining resource metadata and send back the specific portion for the resource to the service (to be ultimately sent to the client). In at least some embodiments, resource attributes that are added, modified, and/or removed via requests 620*a*, 620*b*, and 620*c* may be included in the data provided in response to such requests. The resource metadata, including resource attributes, may also be provided to provider network interfaces, whether graphically and/or programmatically. For instance, a graphical representation of resources associated with a particular account may be displayed via a graphical user interface, with various client submitted resource attributes annotating the displayed resources.

As provider networks are dynamic environments, offering highly-scalable services and resources, the number of resources in a provider network at different network-based services may change over time. For example, in some embodiments, auto-scaling techniques may be implemented to change the resources in one or more given services in response to increased or decreased demand. The changing number of resources may alter what resource attributes should be applied to resources and/or create the need for new resources to be tagged consistent with already existing resources. FIG. 7 is a high-level flowchart illustrating various methods and techniques for implementing applying resources attributes to new resources according to selection criteria, according to some embodiments.

As indicated at 710, an indication of a new resource implemented at a network-based service of a provider network for a client may be received, in various embodiments. For example, a network-based service may send a registration message including resource metadata for the new resource to a resource tag service to be maintained along with other resource metadata for resources. In some embodiments, a client may send an indication of the new resource (and possibly multiple new resources) provisioned at a network-based service (e.g., via a command to search and apply previously submitted resource attribute addition, modification and/or deletion requests to client resources). An event may be triggered or call-back function initiated to provide the new resource indication.

However indicated, in various embodiments, resource metadata for the new resource may be evaluated according to resource metadata selection criteria for resource tagging, as indicated at 720. For example, in some embodiments, requests to add, modify, and/or remove resource attributes may be persisted as resource attribute rules for a particular client. These resource attribute rules may preserve the resource metadata selection criteria (e.g., predicate values, Boolean expressions, or other means of selecting resources according to the resource metadata). Resource attribute rules may also preserve the tags to be applied, modified, or removed. As discussed above with regard to element 630 in FIG. 6, the resource metadata may be evaluated with respect to the resource metadata selection criteria for the various resource attribute rules.

For those resource attributes identified for the new resource, as indicated by the positive exit from 730, the resource attribute identified for the new resource may be maintained in the resource metadata for the new resource, as indicated at 740. As with element 640*a* discussed above, attribute storage may be updated to persistently maintain the attribute for the new resource. Multiple attributes may be identified for a new resource, whether described as part of a same resource attribute rule or different resource attribute rules, in some embodiments. Please note, that although elements 730 and 740 illustrate adding an attribute to a new resource, the same techniques may be implemented to remove attributes from a new resource (e.g., remove a default resource value).

In at least some embodiments, the selection criteria of a submitted resource attribute request to add/modify/remove may be modified, in various embodiments. For example, the predicate value of one or more of the criteria may be changed (e.g., expanding or reducing the resource types to which the attributes to be applied). Moreover, in addition to changing the selection criteria, a resource tag or attributes that are applied/modified/removed may be changed when satisfying the selection criteria. For example, the value of the key in the resource attribute may be changed (e.g., state="reserve" to state="primary"). Modifying selection criteria may be performed to change the way resource attributes are applied to subsequent or new resources in the provider network for the client. For instance, those resources attributed prior to the change of the selection criteria may remain unchanged even though newly indicated resources may have a different version of the resource attribute applied. Alternatively, a change to selection criteria for an attribute may result in an update of the resource attribute being applied for all client resources (e.g., removing and/or adding those resources to be tagged according to the changed selection criteria). As noted earlier, attribution requests may be maintained as resource attribute rules. Thus changes to the selection criteria and/or attribute values may be updated in the corresponding resource attribute rule.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the client and/or provider network described herein). The various methods as illustrated in the figures and described herein represent example embodiments of methods. The order of any method may be changed, and various elements may be added, reordered, combined, omitted, modified, etc.

Figure 8:
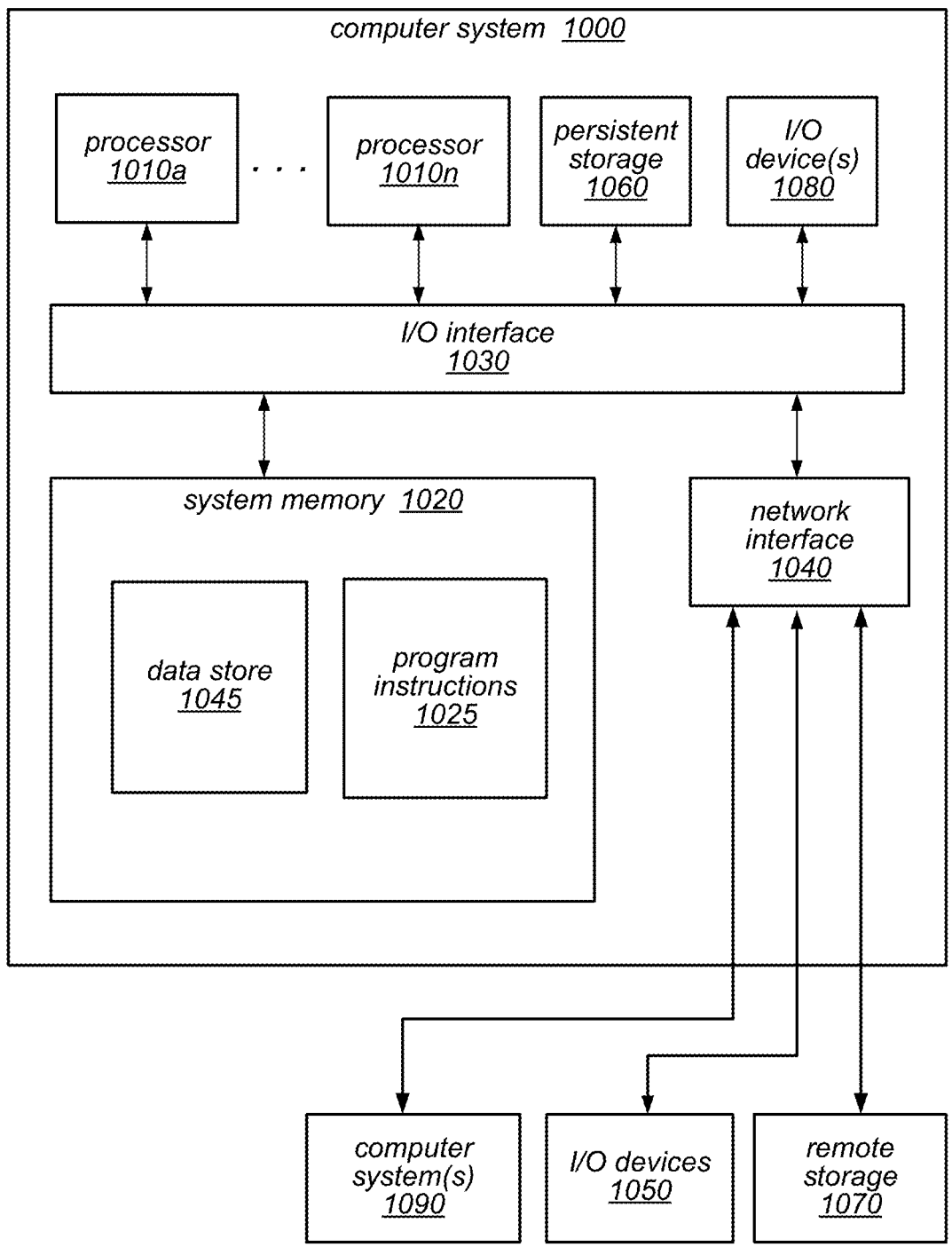
FIG. 8 is a block diagram illustrating an example computing system, according to some embodiments.

Embodiments of automated management of resource attributes across network-based services as described herein may be executed on one or more computer systems, which may interact with various other devices. FIG. 8 is a block diagram illustrating an example computer system, according to various embodiments. For example, computer system 1000 may be configured to implement nodes of a provider network, network-based service, a data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a service platform specific language engine, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a plurality of compute nodes implementing a plurality of different network-based services of a service provider network, wherein a plurality of respective resources is implemented at the plurality of different network-based services for a plurality of clients of the service provider network;
one or more computing devices comprising respective processors and memories storing program instructions for a resource tag service of the plurality of different network-based services that, when executed on or across the one or more respective processors, cause the one or more respective processors to:
   maintain resource attribute rules for adding a resource tag to resources of the plurality of different network-based services that satisfy resource metadata selection criteria for resource tagging, wherein the resource attribute rules indicate the resource tag to be added, and wherein the resource metadata selection criteria comprise one or more resource attributes;
   receive, via an internal programmatic interface between the resource tag service and one or more of the plurality of different network-based services of the service provider network, an indication of a new resource implemented at one of the plurality of different network-based services;
   determine whether resource metadata, that is maintained for the new resource, identifies that the new resource has the one or more resource attributes that are included as part of the resource metadata selection criteria; and
   in response to a determination that the resource metadata identifies that the new resource has the one or more resource attributes, apply the resource tag to the new resource, wherein the applied resource tag is maintained as part of the resource metadata for the new resource.

2. The system of claim 1, wherein the resource tag service is further configured to:
receive a tagging request including the resource metadata selection criteria.

3. The system of claim 1, wherein the resource tag service is further configured to:
  receive a request to remove at least one other resource tag from the resource tag metadata;
  determine whether the resource metadata satisfies resource metadata removal criteria; and
  in response to a determination that the resource metadata satisfies the resource metadata removal criteria, remove the at least one other resource tag from the resource metadata.

4. The system of claim 1, wherein the resource tag service is further configured to:
  after applying the resource tag to the new resource, modify the resource metadata selection criteria;
  determine whether the resource metadata maintained for the new resource satisfies the modified resource metadata selection criteria; and
  in response to a determination that the resource metadata does not satisfy the modified resource metadata selection criteria, remove the resource tag from the resource metadata.

5. The system of claim 1, wherein the indication of the new resource is included in a request received from a client.

6. The system of claim 1, wherein the indication of the new resource is included in a registration message from the one of the plurality of different network-based services, and wherein the registration message includes the resource metadata selection criteria.

7. The system of claim 1, wherein the resource tag is a key-value pair.

8. A method, comprising:
  performing with one or more computing devices of a service provider network that provides a plurality of different network-based services for a plurality of clients of the service provider network:
    maintaining, by a resource tag service, resource attribute rules for adding a resource tag to resources of a plurality of the different network-based services that satisfy resource metadata selection criteria for resource tagging, wherein the resource attribute rules indicate the resource tag to be added, and wherein the resource metadata selection criteria comprise one or more resource attributes;
    receiving, via an internal programmatic interface between the resource tag service and one or more of the plurality of different network-based services of the service provider network, an indication of a new resource implemented at one of the plurality of different network-based services;
    determining whether resource metadata, that is maintained for the new resource, identifies that the new resource has one or more resource attributes that are included as part of the resource metadata selection criteria; and
    in response to a determination that the resource metadata identifies that the new resource has the one or more resource attributes, applying the resource tag to the new resource, wherein the applied resource tag is maintained as part of the resource metadata for the new resource.

9. The method of claim 8, further comprising:
  receiving a tagging request including the resource metadata selection criteria.

10. The method of claim 8, further comprising:
  receiving a request to remove at least one other resource tag from the resource metadata;
  determining whether the resource metadata satisfies resource metadata removal criteria; and
  in response to a determination that the resource metadata satisfies the resource metadata removal criteria, removing the at least one other resource tag from the resource metadata.

11. The method of claim 8, further comprising:
  after applying at least one resource tag to the new resource, modifying the resource metadata selection criteria;
  determining whether the resource metadata maintained for the new resource satisfies the modified resource metadata selection criteria; and
  in response to a determination that the resource metadata does not satisfy the modified resource metadata selection criteria, removing the at least one resource tag from the resource metadata.

12. The method of claim 8, wherein the indication of the new resource is included in a request received from a client.

13. The method of claim 8, wherein the indication of the new resource is included in a registration message from a particular network-based service of the plurality of different network-based services, and wherein the registration message includes the resource metadata selection criteria.

14. The method of claim 8, wherein the resource tag is a key-value pair.

15. One or more non-transitory, computer-readable storage media storing instructions that, when executed on or across one or more processors, cause the one or more processors to:
  maintain, by a resource tag service, resource attribute rules for adding a resource tag to resources of a plurality of different network-based services of a service provider network that satisfy resource metadata selection criteria for resource tagging, wherein the resource attribute rules indicate the resource tag to be added, and wherein the resource metadata selection criteria comprise one or more resource attributes, and wherein the service provider network provides the plurality of different network-based services for a plurality of clients of the service provider network;
  receive, via an internal programmatic interface between the resource tag service and one or more of the plurality of different network-based services of the service provider network, an indication of a new resource implemented at one of a plurality of different network-based services;
  determine whether resource metadata, that is maintained for the new resource, identifies that the new resource has one or more resource attributes that are included as part of the resource metadata selection criteria; and
  in response to a determination that the resource metadata identifies that the new resource has the one or more resource attributes, apply the resource tag to the new resource, wherein the applied resource tag is maintained as part of the resource metadata for the new resource.

16. The one or more non-transitory, computer-readable storage media of claim 15, further comprising instructions that cause the one or more processors to:
  maintain the resource attribute rules in response to a tagging request including the resource metadata selection criteria.

17. The one or more non-transitory, computer-readable storage media of claim 15, further comprising instructions that cause the one or more processors to:

receive a request to remove at least one other resource tag from the resource metadata;

determine whether the resource metadata satisfies resource metadata removal criteria; and in response to a determination that the resource metadata satisfies the resource metadata removal criteria, remove the at least one other resource tag from the resource metadata.

18. The one or more non-transitory, computer-readable storage media of claim 15, further comprising instructions that cause the one or more processors to:

after applying at least one resource tag to the new resource, modify the resource metadata selection criteria;

determine whether the resource metadata maintained for the new resource satisfies the modified resource metadata selection criteria; and in response to a determination that the resource metadata does not satisfy the modified resource metadata selection criteria, remove the at least one resource tag from the resource metadata.

19. The one or more non-transitory, computer-readable storage media of claim 15, wherein the indication of the new resource is included in a request received from a client.

20. The one or more non-transitory, computer-readable storage media of claim 15, wherein the indication of the new resource is included in a registration message from the one of the plurality of different network-based services, and wherein the registration message includes the resource metadata selection criteria.

\* \* \* \* \*